(12) United States Patent
Kunimine et al.

(10) Patent No.: US 8,789,914 B2
(45) Date of Patent: Jul. 29, 2014

(54) INKJET RECORDING METHOD

(71) Applicant: Canon Kabushiki Kaisha, Tokyo (JP)

(72) Inventors: Noboru Kunimine, Tokyo (JP); Takao Ogata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/712,853

(22) Filed: Dec. 12, 2012

(65) Prior Publication Data

US 2013/0155144 A1 Jun. 20, 2013

(30) Foreign Application Priority Data

Dec. 15, 2011 (JP) ................................ 2011/079035

(51) Int. Cl.
*B41J 2/07* (2006.01)
*G01D 11/00* (2006.01)

(52) U.S. Cl.
USPC ............................................ 347/20; 347/100

(58) Field of Classification Search
USPC ................................. 347/6, 20, 100
See application file for complete search history.

(56) References Cited

U.S. PATENT DOCUMENTS

| 7,674,329 B2 * | 3/2010 | Koga et al. ................. 106/31.59 |
| 2008/0079793 A1 * | 4/2008 | Kato et al. .................... 347/100 |
| 2013/0149505 A1 * | 6/2013 | Yano et al. ................. 428/195.1 |

FOREIGN PATENT DOCUMENTS

| JP | 7-125406 A | | 5/1995 |
| JP | 9-262993 A | | 10/1997 |
| JP | 2000-289193 A | | 10/2000 |
| JP | 2000289193 A | * | 10/2000 |
| JP | 2007-136735 A | | 6/2007 |

* cited by examiner

*Primary Examiner* — Lisa M Solomon
(74) *Attorney, Agent, or Firm* — Canon U.S.A., Inc., IP Division

(57) ABSTRACT

An inkjet recording method includes applying a pigment-containing first black ink to a recording medium to record an edge region of an image, and applying a pigment-containing second black ink to the recording medium to record an inner region of the image. A dynamic surface tension $\gamma_1$ of the first black ink determined by a maximum bubble pressure method for a lifetime of 100 ms and a dynamic surface tension $\gamma_2$ of the second black ink determined by a maximum bubble pressure method for a lifetime of 100 ms satisfy relationships of condition (1) of $\gamma_1 > \gamma_2$, condition (2) of $\gamma_1 - \gamma_2 \leq 20$ mN/m, condition (3) of 40 mN/m $\leq \gamma_1$, and condition (4) of 34 mN/m $\leq \gamma_2$.

3 Claims, 1 Drawing Sheet

INKJET RECORDING METHOD

TECHNICAL FIELD

The present invention relates to an inkjet recording method.

BACKGROUND ART

In inkjet recording methods, in order to provide images having high fixability even in the cases of high-speed recording, inks having a high penetrability are employed. On the other hand, inkjet recording methods are also used for output from CAD systems and the like and hence high fine-line quality is demanded. However, when fine lines are recorded with such inks that have a high penetrability and provide images having high fixability, high fine-line quality is not achieved. This is because inks having a high penetrability have high spreadability on recording media. In short, in order to obtain images having high fine-line quality that can be even used for output from CAD systems and the like, spreading of inks on recording media needs to be suppressed on a higher level to suppress blurring of images. A method for suppressing blurring of images on recording media has been studied: an inkjet recording method in which the edge region of an image is recorded with an ink having a low penetrability and the inner region of the image is recorded with an ink having a high penetrability (Patent Literature 1). PTL 1 discloses that, by recording the edge region of an image with an ink having a surface tension of 40 mN/m to 65 mN/m and by recording the inner region of the image with an ink having a surface tension of 25 mN/m to 35 mN/m, spreading of the inks is suppressed and blurring of the image is suppressed.

CITATION LIST

Patent Literature

PTL 1 Japanese Patent Laid-Open No. 2000-289193

However, the inventors of the present invention recorded fine lines by the inkjet recording method described in PTL 1 and inspected the fine lines and, as a result, they have found that there are cases where high fine-line quality sufficient for output from CAD systems and the like is not achieved. Accordingly, an object of the present invention is to provide an inkjet recording method in which blurring of images is effectively suppressed so that high fine-line quality is achieved.

SUMMARY OF INVENTION

An inkjet recording method according to aspects of the present invention includes applying a pigment-containing first black ink through an inkjet recording head to a recording medium to record an edge region of an image; and applying a pigment-containing second black ink through an inkjet recording head to the recording medium to record an inner region of the image, wherein a dynamic surface tension $\gamma_1$ of the first black ink determined by a maximum bubble pressure method for a lifetime of 100 ms and a dynamic surface tension $\gamma_2$ of the second black ink determined by a maximum bubble pressure method for a lifetime of 100 ms satisfy relationships of condition (1) of $\gamma_1 > \gamma_2$, condition (2) of $\gamma_1 - \gamma_2 \leq 20$ mN/m, condition (3) of 40 mN/m $\leq \gamma_1$, and condition (4) of 34 mN/m $\leq \gamma_2$.

Further features of the present invention will become apparent from the following description of exemplary embodiments with reference to the attached drawings.

DESCRIPTION OF EMBODIMENTS

Figure 1A:
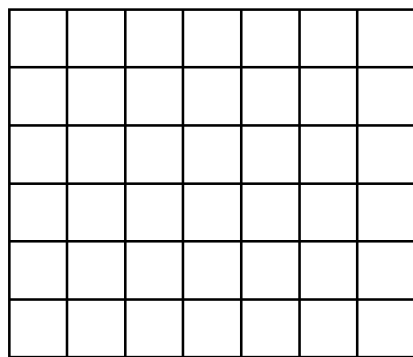
FIGS. 1A to 1C illustrate the edge region and inner region of an image in the present invention.

Hereinafter, the present invention will be described in detail with reference to preferred embodiments. The inventors of the present invention first studied the reason why high fine-line quality is not achieved in some cases of employing the existing inkjet recording method in PTL 1 in which the edge region of an image is recorded with an ink having a low penetrability and the inner region of the image is recorded with an ink having a high penetrability. As a result, the inventors have reached the following conclusion.

When two inks satisfying the surface-tension conditions in PTL 1 are used to record images, as described above, blurring of images due to spreading of the inks is suppressed. However, on the other hand, the inventors have found that blurring of images can be caused because, at the boundary between the inner region and the outer region, a phenomenon where the black ink having a high penetrability applied to the inner region flows into the black ink having a low penetrability applied to the outer region occurs and the ink having flowed flows outside the edge region. This inflow phenomenon occurs when liquids having different penetrabilities, that is, different surface energies, come into contact with one another and liquid movement occurs such that the surface energies of the liquids are balanced. As is obvious from this mechanism, the larger the difference in surface energy between two inks, the more noticeable the inflow phenomenon. The existing inkjet recording method in which the edge region of an image is recorded with an ink having a low penetrability and the inner region of the image is recorded with an ink having a high penetrability is based on a technical idea that fixability and suppression of blurring of the image are both achieved by using the ink having a low penetrability and a low spreadability only for the edge region of the image where blurring of the image is likely to be caused and by using the ink having a high penetrability and a short fixing time for the inner region. In short, in the existing method, the inks are designed such that the penetrability of the black ink used for the inner region is maximized relative to the penetrability of the black ink used for the edge region, that is, the difference in surface energy between the two inks is maximized. Accordingly, the inflow phenomenon probably occurs more noticeably, resulting in blurring of the image.

Thus, it has been found that it is important to suppress not only image blurring due to spreading of ink but also image blurring due to the ink inflow phenomenon. The inventors of the present invention then performed thorough studies and have reached the following conclusion: to suppress image blurring due to the ink inflow phenomenon, it is important to design inks such that the difference in surface energy between the black ink used for the edge region and the black ink used for the inner region is not excessively large. In the present invention, the difference in surface energy between the two inks is represented by dynamic surface tensions of the black inks. The reason for this is as follows.

The surface energy of an ink droplet having been discharged from a recording head varies from moment to moment. This is because the interface of an ink droplet is in an unstable fluid state. A variation in the surface energy of an ink droplet in the unstable fluid state can be represented by a variation in the dynamic surface tension over time from the generation of the interface of an ink droplet to the point at which it reaches a state of equilibrium. Accordingly, in the present invention, the surface energies of inks are represented by the dynamic surface tensions of the inks.

In PTL 1, the penetrabilities of the two inks are defined with static surface tension. However, since static surface tension is a surface tension in a state where the interface of a liquid is stable, it is not suitable for representing the surface energy of a liquid whose interface is in an unstable state, such as an ink droplet having been discharged. In addition, even when two inks satisfy the definitions in terms of static surface tension in PTL 1, the two inks may have a large difference in dynamic surface tension, that is, a large difference in surface energy. Thus, the inflow phenomenon probably occurs, causing the image blurring.

In the present invention, the dynamic surface tension of an ink is a value determined by a maximum bubble pressure method at 25° C. for a lifetime of 100 ms. The maximum bubble pressure method denotes a method in which the maximum pressure required to discharge a bubble formed at the tip portion of a probe immersed in a liquid to be measured is measured and, from the maximum pressure, surface tension is determined. The lifetime in the maximum bubble pressure method denotes, in the formation of a bubble at the tip portion of a probe, a time from, after the release of a bubble from the tip portion, the formation of the surface of a new bubble to the maximum bubble pressure time (time at which the radius of curvature of a bubble becomes equal to the radius of the tip portion of the probe). Plotting the surface tension with respect to the lifetime indicates variations in the dynamic surface tension of the liquid over time. In general, the time from discharging of an ink to the contact of the ink with a recording medium is 1000 ms or less. Accordingly, in the present invention, the value of dynamic surface tension for a lifetime of 100 ms is employed. As described below, it has been found that the dynamic surface tension for a lifetime of 100 ms strongly correlates with the inflow phenomenon and spreadability of ink. In Examples described below, the dynamic surface tension was determined with a bubble pressure dynamic surface tensiometer BP2 (manufactured by KRUSS) at 25° C.

The inventors of the present invention first studied on various combinations of black inks in terms of the correlation between the dynamic surface tensions and the inflow phenomenon and spreadability of the inks. As a result, the inventors have found that a dynamic surface tension $\gamma_1$ of a first ink used for the edge region and a dynamic surface tension $\gamma_2$ of a second ink used for the inner region need to satisfy relationships of condition (1) of $\gamma_1 > \gamma_2$, condition (2) of $\gamma_1 - \gamma_2 \leq 20$ mN/m, condition (3) of 40 mN/m $\leq \gamma_1$, and condition (4) of 34 mN/m $\leq \gamma_2$. When the first ink and the second ink satisfy the conditions (1), (3), and (4), the first ink and the second ink have low spreadability and spreading of ink is suppressed in the edge region relative to the inner region. Accordingly, compared with cases of not recording the edge region, image blurring due to spreading of ink can be suppressed. In addition to these conditions, when the condition (2) is satisfied, the difference in surface energy between the ink used for the edge region and the ink used for the inner region does not become excessively large. Thus, image blurring due to the ink inflow phenomenon in the existing technique can be suppressed.

When the condition (1) is not satisfied ($\gamma_1 \leq \gamma_2$), blurring due to ink spreading in the edge region is caused and high fine-line quality is not achieved. When the condition (2) is not satisfied ($\gamma_1 - \gamma_2 > 20$ mN/m), the inflow phenomenon from the inner region to the edge region occurs. Thus, blurring is caused and high fine-line quality is not achieved. When the condition (3) is not satisfied ($\gamma_1 < 40$ mN/m), ink spreadability in the edge region is high and blurring is caused and high fine-line quality is not achieved. When the condition (4) is not satisfied ($\gamma_2 < 34$ mN/m), ink spreadability in the inner region is high. Accordingly, even when the relationship in the condition (2) is satisfied, the ink in the inner region spreads to the region outside the edge region. Thus, high fine-line quality is not achieved.

The inventors of the present invention further performed studies and have found that the dynamic surface tension $\gamma_1$ of the first ink and the dynamic surface tension $\gamma_2$ of the second ink preferably satisfy, in addition to the conditions (1) to (4), and condition (5) of $\gamma_2 \leq 45$ mN/m. When the condition (5) is satisfied, image fixability is enhanced. In addition, the dynamic surface tension $\gamma_1$ of the first ink preferably satisfies condition (6) of $\gamma_1 \leq 65$ mN/m. In the present invention, in order to satisfy the specific relationships of dynamic surface tensions described in the conditions (1) to (6), components of the first black ink and the second black ink are appropriately selected and, for example, the contents of the components may be adjusted. Specifically, for example, the type or content of a water-soluble organic solvent or a surfactant can be adjusted.

When features of the present invention synergistically function as described in the mechanism above, an image-blurring suppression effect on a high level that is not achieved in existing inkjet recording methods can be provided.

[Inkjet Recording Method]

An inkjet recording method according to the present invention includes a step of applying a first black ink through an inkjet recording head to a recording medium to record an edge region of an image (hereafter also referred to as "outlining step"), and a step of applying a second black ink through an inkjet recording head to the recording medium to record an inner region of the image.

Figure 1B:
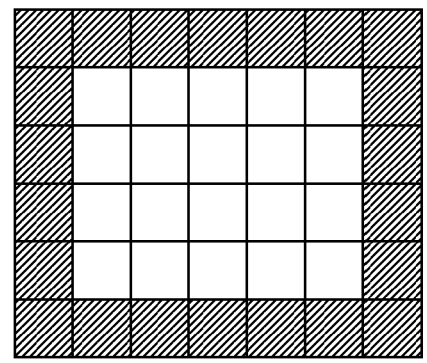
Figure 1C:
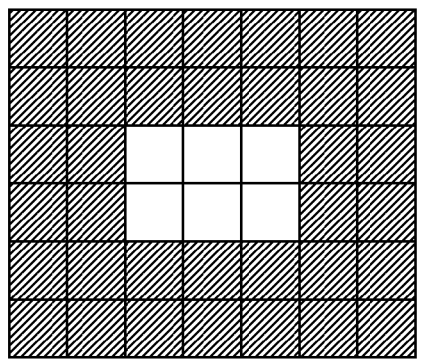

In the present invention, in a recording medium, a region where an image is recorded is referred to as "a recording region" and a region where no image is recorded is referred to as "a non-recording region". Here, in the present invention, "the edge region of an image" means, in the recording region, a region that extends from the outermost edge in contact with the non-recording region toward inside of the recording region and that corresponds to a predetermined number of pixels. In the present invention, a pixel corresponds to a single pixel of a recording head. In the present invention, the predetermined number of pixels is preferably appropriately set in accordance with the type of an image. In the present invention, the predetermined number of pixels is preferably one or more, more preferably two or more, still more preferably six or less. On the other hand, "the inner region of an image" in the present invention means, in the recording region, a region other than the edge region. Here, an image (an image having six pixels in the longitudinal direction and seven pixels in the lateral direction) in FIG. 1A is used as an example and specifically described. When the predetermined number of pixels is one, in FIG. 1B, the hatched portion is the edge region of the image and the other portion is the inner region. When the predetermined number of pixels is two, in FIG. 1C, the hatched portion is the edge region of the image and the other portion is the inner region.

In the present invention, when an image in which a black-ink recording region is adjacent to a color-ink recording region is recorded, the outlining step for the black-ink recording region may be omitted. At this time, when the outlining for the black-ink recording region is performed, the first black ink having a low penetrability is applied near the region to which the color ink has been applied and hence color mixing (bleeding) between the color ink and the black ink may occur in the boundary portion. When an image in which a black-ink recording region passes through a non-recording region and a color-ink recording region is recorded, it is preferable that the outlining step for the black-ink recording region be performed only in the boundary portion between the non-recording region and the black-ink recording region and the outlining step for the black-ink recording region not be performed in the boundary portion between the color-ink recording region and the black-ink recording region.

In the present invention, application of the first black ink and the second black ink to a recording medium is preferably performed by an inkjet recording method in which thermal energy is applied to the inks so that the inks are discharged through discharge ports of recording heads. The "recording" in the present invention encompasses embodiments where recording is performed on a recording medium such as glossy paper or normal paper and embodiments where printing is performed on an impermeable recording medium such as glass, plastic, or a film. In particular, an inkjet recording method according to the present invention is preferably used in the cases where recording media are normal paper and plotter paper. When the recording medium is glossy paper, the outlining step for the black-ink recording region may be omitted.

An inkjet recording method according to the present invention includes two steps: a step (A) of applying a first black ink to a recording medium, and a step (B) of applying a second black ink to the recording medium. In this case, the step (A) may be followed by the step (B) or the step (B) may be followed by the step (A). When the same step is performed twice or more, for example, step (A)→step (B)→step (A) or step (B)→step (A)→step (B) may be performed. In particular, the step (B) followed by the step (A) is preferred because the inflow phenomenon is less likely to occur. Hereinafter, the first ink and the second ink used in an inkjet recording method according to the present invention will be described.

<First Black Ink and Second Black Ink>

In the present invention, the first black ink and the second black ink satisfy the specific relationships of dynamic surface tensions. Hereinafter, components usable for the first black ink and the second black ink in the present invention will be described.

(Pigment)

In the present invention, the first and second black inks contain pigment. The pigment may be any known pigment. The pigment content (percent by mass) with respect to the total mass of each black ink is preferably 0.1% or more by mass and 15.0% or less by mass, more preferably 1.0% or more by mass and 10.0% or less by mass. More preferably, the pigment content in the first black ink is 1.5% or more by mass and 3.0% or less by mass, and the pigment content in the second black ink is 3.0% or more by mass and 6.0% or less by mass. The pigment content in the first black ink is preferably lower than the pigment content in the second black ink. This is because the first black ink is designed to have a penetrability lower than the penetrability of the second ink and hence it has lower image fixability than the second black ink; accordingly, by making the pigment content in the first black ink be lower than the pigment content in the second black ink, fixability can be made uniform on the whole image.

In the present invention, as to a pigment dispersion system, there are resin-dispersion-type pigments employing resins as dispersing agents (a resin-dispersion pigment employing a resin dispersing agent, a microcapsule pigment in which the surfaces of pigment particles are covered with a resin, or a resin-bonded pigment in which an organic group containing a resin is chemically bonded to the surfaces of pigment particles) and self-dispersing-type pigments (self-dispersible pigments) in which hydrophilic groups are introduced into the surfaces of pigment particles. Pigments based on different dispersion systems may be clearly used in combination. In the present invention, the pigment dispersion system is preferably the same in the first black ink and the second black ink. For example, when the first black ink contains a self-dispersible pigment, the second black ink preferably also contains a self-dispersible pigment.

When a pigment used for an ink is such a resin-dispersion-type pigment, a resin is used as a dispersing agent. The resin dispersing agent preferably has both a hydrophilic moiety and a hydrophobic moiety. Specific examples include acrylic resins prepared by polymerization of a hydrophilic monomer having a carboxylic group such as acrylic acid or methacrylic acid and a hydrophobic monomer having an aromatic group such as styrene, benzyl acrylate, or benzyl methacrylate; and urethane resins prepared by polymerization with a diol having an anionic group such as dimethylolpropionic acid. The resin dispersing agent preferably has an acid value of 50 mgKOH/g or more and 300 mgKOH/g or less. The resin dispersing agent preferably has a weight-average molecular weight (Mw) of 1,000 or more and 15,000 or less determined by GPC in terms of polystyrene standards. The content (percent by mass) of the resin dispersing agent in an ink with respect to the total mass of the ink is preferably 0.1% or more by mass and 10.0% or less by mass, more preferably 0.2% or more by mass and 4.0% or less by mass. The mass ratio of the content (percent by mass) of the resin dispersing agent to the content (percent by mass) of the pigment is preferably 0.1 or more and 1.0 or less. In the present invention, the pigment is preferably carbon black. When carbon black is employed, any carbon black that is generally used for an inkjet ink can be employed. Specific examples include furnace black, acetylene black, channel black, thermal black, and lamp black.

<Aqueous Medium>

In the present invention, water or an aqueous medium that is a solvent mixture of water and a water-soluble organic solvent may be used for the first and second black inks. The content (percent by mass) of the water-soluble organic solvent in such an ink with respect to the total mass of the ink is preferably 3.0% or more by mass and 50.0% or less by mass. The water-soluble organic solvent may be any water-soluble organic solvent that is generally used. Examples include alcohols, glycols, alkylene glycols whose alkylene group has 2 to 6 carbon atoms, polyethylene glycols, nitrogen-containing compounds, and sulfur-containing compounds. These water-soluble organic solvents may be used alone or two or more thereof if necessary. The water is preferably deionized water (ion-exchange water). The content (percent by mass) of water in such an ink with respect to the total mass of the ink is preferably 50.0% or more by mass and 95.0% or less by mass.

<Surfactant>

In the present invention, a surfactant may be used for the first and second black inks. Examples of the surfactant include anionic surfactants, cationic surfactants, amphoteric surfactants, and nonionic surfactants. In particular, nonionic surfactants are preferably used in order not to affect the dispersion stability of the pigment. Specific examples of the nonionic surfactants include ethylene oxide adducts of alkyl phenyl ethers, polyethylene oxide-polypropylene oxide copolymers, and ethylene oxide adducts of acetylene glycol.

<Other Components>

In the present invention, the first and second black inks may contain, if necessary, in addition to the above-described components, water-soluble organic compounds that are in solid form at room temperature, for example, polyhydric alcohols such as trimethylol propane and trimethylol ethane, urea, and urea derivatives such as ethylene urea. In the present invention, the inks may contain, if necessary, various additives such as pH adjusting agents, rust inhibitors, antiseptics, fungicides, antioxidants, anti-reducing agents, evaporation promoting agents, chelating agents, and resins. In the present invention, the inks preferably do not contain reaction agents.

<Method for Adjusting Surface Tensions of Inks>

As described above, in the present invention, the dynamic surface tension of each black ink can be adjusted by changing, for example, the type or content of a water-soluble organic solvent or a surfactant. In view of image fixability, not a surfactant but a water-soluble organic solvent is preferably added to the ink to thereby adjust the dynamic surface tension. The reason for this is as follows.

The penetrability of an ink into a recording medium is influenced not only by the dynamic surface tension but also considerably by the content of a surfactant or water-soluble organic solvent in the ink. That is, when inks having the same dynamic surface tension are compared with each other, one of the inks that has a higher content of a surfactant or water-soluble organic solvent in the ink has a higher penetrability. On the other hand, in general, between a surfactant and a water-soluble organic solvent in the same amount, the surfactant causes a larger decrease in the surface tension than the water-soluble organic solvent. Accordingly, in order to prepare an ink having a specific dynamic surface tension, the amount of a water-soluble organic solvent in the case of adjustment using not a surfactant but the water-soluble organic solvent is larger than the amount of a surfactant in the case of adjustment using not a water-soluble organic solvent but the surfactant. Thus, adjustment of the surface tension with a water-soluble organic solvent, which can be added in a large amount to an ink, is preferred because the ink has a high penetrability and the resultant images have high fixability. Preferred examples of a water-soluble organic solvent for adjusting the dynamic surface tension of black ink include linear α,β-alkanediols whose alkyl groups have 5 or more carbons such as 1,2-pentanediol, 1,2-hexanediol, 1,2-heptanediol, and 1,2-octanediol; 4-methyl-1,2-pentanediol, 3,3-dimethyl-1,2-butanediol, 4,4-dimethyl-1,2-pentanediol, 4-methyl-1,2-hexanediol, 5-methyl-1,2-hexanediol, 4-methyl-1,2-pentanediol, 3,3-dimethyl-1,2-butanediol, and 2-butyl-2-methyl-1,3-propanediol. Another water-soluble organic solvent can be used for adjustment to a dynamic surface tension similar to that achieved by the exemplified water-soluble organic solvents. However, a large content of the water-soluble organic solvent is necessary and the discharge stability of the ink may be degraded, which is not preferable. In the present invention, in particular, the penetrability of the second black ink applied to the inner region considerably influences image fixability and hence the dynamic surface tension is preferably adjusted with a water-soluble organic solvent. Accordingly, the second black ink preferably contains at least one selected from the preferred water-soluble organic solvents for adjusting dynamic surface tension. In particular, the second black ink more preferably contains at least one selected from the linear α,β-alkanediols whose alkyl groups have 5 or more carbons. Furthermore, in particular, the second black ink preferably does not contain any surfactant and contains at least one selected from the linear α,β-alkanediols whose alkyl groups have 5 or more carbons. In the second black ink, the content (percent by mass) of such a preferred water-soluble organic solvent for adjusting dynamic surface tension may be appropriately adjusted in accordance with a desired dynamic surface tension; in view of the effect of enhancing image fixability, the content is preferably 1.5% or more by mass. In the second black ink, the content (percent by mass) of such a preferred water-soluble organic solvent for adjusting dynamic surface tension is preferably 30.0% or less by mass.

The content of such a linear α,β-alkanediol whose alkyl group has 5 or more carbons in the second black ink is preferably higher than the content of such a linear α,β-alkanediol whose alkyl group has 5 or more carbons in the first black ink. More preferably, the first black ink does not contain any linear α,β-alkanediol whose alkyl group has 5 or more carbons; and the second black ink contains a linear α,β-alkanediol whose alkyl group has 5 or more carbons. Further, more preferably, the first black ink does not contain any linear α,β-alkanediol whose alkyl group has 5 or more carbons and contains an ethylene oxide adduct of acetylene glycol; and the second black ink contains a linear α,β-alkanediol whose alkyl group has 5 or more carbons.

EXAMPLES

Hereinafter, the present invention will be described further in detail with Examples and Comparative examples. The present invention is not limited by Examples below at all within the gist of the present invention. In the description of Examples below, "parts" is based on mass unless otherwise specified.

<Preparation of Pigment Dispersions>

(Preparation of Pigment Dispersion A)

MA77 (manufactured by Mitsubishi Chemical Corporation), which is commercially available as a self-dispersible carbon black in which a hydrophilic group (carboxyl group) is bonded to carbon-black surfaces, was diluted with water and sufficiently stirred to provide a pigment dispersion A. The pigment content in the pigment dispersion A was 10.0% by mass.

(Preparation of Pigment Dispersion B)

A styrene-acrylic acid-ethyl acrylate copolymer having an acid value of 200 mgKOH/g and a weight-average molecular weight of 5,000 was neutralized with a 10% by mass aqueous solution of potassium hydroxide. Subsequently, 10 parts of Carbon black FW18 (manufactured by Degussa), 4 parts of the neutralized styrene-acrylic acid-ethyl acrylate copolymer, and 86 parts of water were mixed. This mixture was dispersed with a batch-type vertical sand mill for three hours, then subjected to a centrifugal treatment to remove coarse particles, and filtered under pressure with a microfilter (manufactured by FUJIFILM Corporation) having a pore size of 3.0 μm. Such a method provided a pigment dispersion B in which carbon black was dispersed with the resin in water. In the pigment dispersion B, the pigment content was 10.0% by mass and the resin content was 4.0% by mass.

(Preparation of Pigment Dispersion C)

Cab-O-Jet300 (manufactured by Cabot Corporation), which is commercially available as a self-dispersible carbon black in which a hydrophilic group (4-carboxylphenyl group) is bonded to carbon-black surfaces, was diluted with water and sufficiently stirred to provide a pigment dispersion C. The pigment content in the pigment dispersion C was 10.0% by mass.

<Preparation of Black Inks>

The pigment dispersions obtained above were mixed so as to satisfy compositions in Table 1 and Table 2, dispersed through sufficient stirring, and filtered under pressure with a microfilter (manufactured by FUJIFILM Corporation) having a pore size of 3.0 μm to thereby prepare black inks. The obtained black inks were measured at 25° C. in terms of static surface tension and dynamic surface tension. The static surface tension was measured with an automatic surface tensiometer CBVP-Z (manufactured by Kyowa Interface Science Co., Ltd.) by the Wilhelmy method. As to the dynamic surface tension, a value for a lifetime of 100 ms was measured with a bubble pressure dynamic surface tensiometer BP2 (manufactured by KRUSS). The results are described in Table 1 and Table 2. In the Tables, Acetylenol E100 is a surfactant manufactured by Kawaken Fine Chemicals Co., Ltd.; and BL9-EX denotes NIKKOL BL9-EX, which is a surfactant manufactured by Nikko Chemicals Co., Ltd.

inkjet recording apparatus and an image was recorded by a single-pass back-and-forth recording. The recording conditions were a temperature of 25° C. and a relative humidity of 50%. In the inkjet recording apparatus, when an image is recorded at a resolution of 1200 dpi×1200 dpi such that a single droplet of an ink (about 4 ng) is applied to a unit region (single pixel) of $1/1200$ inches×$1/1200$ inches, the ink recording duty is defined as 100%.

<Suppression of Image Blurring>

A 20 mm×20 mm solid image was recorded on a PPC paper GF-500 (manufactured by CANON KABUSHIKI KAISHA) with the inkjet recording apparatus. At this time, the width of the edge region was defined as four pixels and the first black ink was applied to the edge region at a recording duty of 100%; and the second black ink was applied to the other

TABLE 1

Compositions and properties of black inks

| | | Black ink 1 | Black ink 2 | Black ink 3 | Black ink 4 | Black ink 5 | Black ink 6 | Black ink 7 | Black ink 8 | Black ink 9 |
|---|---|---|---|---|---|---|---|---|---|---|
| Pigment dispersions (pigment content is 10.0% by mass) | Pigment dispersion A | 20.00 | 20.00 | 20.00 | 35.00 | 5.00 | 20.00 | — | 4.00 | — |
| | Pigment dispersion B | — | — | — | — | — | — | 20.00 | — | 4.00 |
| Surfactants | Acetylenol E100 | 0.10 | — | — | 0.10 | 0.10 | — | — | — | — |
| | BL9-EX | — | 0.15 | 0.20 | — | — | — | — | — | — |
| 1,2-Hexanediol | | — | — | — | — | 0.50 | 0.50 | 0.50 | — | — |
| Glycerin | | 7.00 | 7.00 | 7.00 | 7.00 | 7.00 | 7.00 | 7.00 | 7.00 | 7.00 |
| Diethylene glycol | | 5.00 | 5.00 | 5.00 | 5.00 | 5.00 | 5.00 | 5.00 | 5.00 | 5.00 |
| γ-Butyrolactone | | — | — | — | — | — | — | — | 5.00 | 5.00 |
| Water | | 67.90 | 67.85 | 67.80 | 52.90 | 82.40 | 67.50 | 67.50 | 80.90 | 80.90 |
| Static surface tension (mN/m) | | 41 | 32 | 31 | 41 | 39 | 54 | 54 | 57 | 57 |
| Dynamic surface tension γ (mN/m) | | 44 | 40 | 38 | 45 | 43 | 58 | 57 | 58 | 58 |

TABLE 2

Compositions and properties of black inks

| | | Black ink 10 | Black ink 11 | Black ink 12 | Black ink 13 | Black ink 14 | Black ink 15 | Black ink 16 | Black ink 17 | Black ink 18 | Black ink 19 | Black ink 20 | Black ink 21 |
|---|---|---|---|---|---|---|---|---|---|---|---|---|---|
| Pigment dispersions (pigment content is 10.0% by mass) | Pigment dispersion A | 40.00 | 40.00 | 40.00 | 40.00 | 40.00 | 20.00 | 40.00 | 40.00 | 40.00 | — | — | 40.00 |
| | Pigment dispersion B | — | — | — | — | — | — | — | — | — | 40.00 | — | — |
| | Pigment dispersion C | — | — | — | — | — | — | — | — | — | — | 40.00 | — |
| Surfactant | Acetylenol E100 | — | 0.10 | 0.10 | — | 1.00 | — | — | — | 0.30 | 0.10 | 0.10 | — |
| 1,2-Pentanediol | | — | — | — | — | — | — | — | — | — | — | — | 9.00 |
| 1,2-Hexanediol | | 3.00 | 1.50 | 2.50 | 5.00 | — | 3.00 | — | — | 3.00 | 3.00 | — |
| 1,2-Octanediol | | — | — | — | — | — | — | 0.50 | — | — | — | — | — |
| 2-Butyl-2-methyl-1,3-propanediol | | — | — | — | — | — | — | — | 0.75 | — | — | — | — |
| Glycerin | | 7.00 | 7.00 | 7.00 | 7.00 | 7.00 | 7.00 | 7.00 | 7.00 | 7.00 | 7.00 | 7.00 | 7.00 |
| Diethylene glycol | | 5.00 | 5.00 | 5.00 | 5.00 | 5.00 | 5.00 | 5.00 | 5.00 | 5.00 | 5.00 | 5.00 | 5.00 |
| Potassium sulfate | | — | — | 0.30 | — | — | — | — | — | — | — | — | — |
| Water | | 45.00 | 46.40 | 45.10 | 43.00 | 47.00 | 65.00 | 47.50 | 47.25 | 47.70 | 44.90 | 44.90 | 39.00 |
| Static surface tension (mN/m) | | 37 | 43 | 36 | 33 | 30 | 37 | 31 | 35 | 35 | 36 | 31 | 41 |
| Dynamic surface tension γ (mN/m) | | 39 | 45 | 38 | 34 | 31 | 39 | 35 | 38 | 38 | 38 | 35 | 40 |

[Evaluations]

Such black inks obtained above were charged into ink cartridges and combined in accordance with combinations described in Table 3. The ink cartridges were attached to an region, the inner region, at a recording duty of 100%. The resultant image was visually inspected to thereby evaluate suppression of image blurring. The evaluation system in terms of suppression of image blurring is described below. In the present invention, under the evaluation system below, A and B are defined as allowable levels and C is defined as an unallowable level. The evaluation results are described in Table 3.
  A: No image blurring
  B: Substantially no image blurring
  C: Occurrence of image blurring <Fine-Line Quality>

A fine line having a width of 16 pixels and a length of 50 mm was recorded on a PPC paper GF-500 (manufactured by CANON KABUSHIKI KAISHA) with the inkjet recording apparatus. At this time, the width of the edge region was defined as two pixels and the first black ink was applied to the edge region at a recording duty of 100%; and the second black ink was applied to the other region, the inner region, at a recording duty of 100%. Here, the theoretical value of the width (16 pixels) of the fine line calculated from the resolution is 340 µm. As to the obtained fine line, the raggedness value and line width of the fine line were measured with a personal image analysis system, Personal IAS (manufactured by Quality Engineering Associates), in accordance with the fine-line evaluation method defined by ISO 13660. In the present invention, under the evaluation systems for (1) fine-line roughness and (2) line-width reproducibility below, A and B are defined as fine-line quality on an allowable level and C and D are defined as fine-line quality on an unallowable level.

(1) Fine-Line Roughness

Evaluation in terms of fine-line roughness was performed on the basis of the raggedness value obtained above. The smaller the raggedness value, the lower the fine-line roughness and the higher the fine-line quality. The evaluation system for the fine-line roughness is described below. The evaluation results are described in Table 3.

A: Raggedness value of 10 or less
  B: Raggedness value of more than 10 and 15 or less
  C: Raggedness value of more than 15 and 20 or less
  D: Raggedness value of more than 20

(2) Line-Width Reproducibility

Evaluation in terms of line-width reproducibility was performed on the basis of the line width of the fine line obtained above. Specifically, the difference (Δd) between the measured value of the line width and the above-described theoretical value (340 µm) was calculated to thereby perform evaluation in terms of line-width reproducibility. The larger Δd, the thicker the recorded fine line with respect to the desired fine-line width. Accordingly, the fine-line quality is low. The evaluation system for the line-width reproducibility is described below. The evaluation results are described in Table 3.

A: Δd of 30 µm or less
  B: Δd of more than 30 µm and 60 µm or less
  C: Δd of more than 60 µm <Image Fixability>

An image similar to the above-described image used in the evaluation of <Suppression of image blurring> was recorded. Immediately after the paper was ejected from the inkjet recording apparatus, the image was marked with a highlighter, Spotlighter V-OA (manufactured by PILOT CORPORATION), across the inner region and edge region of the image, and smudging in the image was inspected. In the present invention, under the evaluation system below, A and B are evaluated as high image fixability and are preferable. The evaluation system for the image fixability is described below. The evaluation results are described in Table 3.

A: Substantially no image smudging
  B: Occurrence of image smudging but not on noticeable level
  C: Occurrence of image smudging

TABLE 3

Combinations of the first and second black inks and evaluation results

| | First black ink | | Second black ink | | | Evaluation results | | | |
| --- | --- | --- | --- | --- | --- | --- | --- | --- | --- |
| | | | | | | | Fine-line quality | | |
| | | | | | | Suppression | | | |
| Example No. | NO. | γ₁ (mN/m) | No. | γ₂ (mN/m) | γ₁−γ₂ (mN/m) | of image blurring | (1) Fine-line roughness | (2) Line-width reproducibility | Image fixability |
| Example 1 | Black ink 1 | 44 | Black ink 10 | 39 | 5 | A | A | A | A |
| Example 2 | Black ink 2 | 40 | Black ink 10 | 39 | 1 | A | B | B | A |
| Example 3 | Black ink 4 | 45 | Black ink 10 | 39 | 6 | A | A | A | A |
| Example 4 | Black ink 5 | 43 | Black ink 10 | 39 | 4 | A | A | A | A |
| Example 5 | Black ink 6 | 58 | Black ink 10 | 39 | 19 | A | A | A | B |
| Example 6 | Black ink 1 | 44 | Black ink 12 | 38 | 6 | A | A | A | A |
| Example 7 | Black ink 1 | 44 | Black ink 13 | 34 | 10 | A | B | B | A |
| Example 8 | Black ink 1 | 44 | Black ink 15 | 39 | 5 | A | A | A | A |
| Example 9 | Black ink 1 | 44 | Black ink 16 | 35 | 9 | A | B | B | B |
| Example 10 | Black ink 1 | 44 | Black ink 17 | 38 | 6 | A | A | A | B |
| Example 11 | Black ink 1 | 44 | Black ink 18 | 38 | 6 | A | A | A | B |
| Example 12 | Black ink 1 | 44 | Black ink 19 | 38 | 6 | A | A | A | A |
| Example 13 | Black ink 1 | 44 | Black ink 20 | 35 | 9 | A | A | A | A |
| Example 14 | Black ink 4 | 45 | Black ink 15 | 39 | 6 | A | A | A | B |
| Example 15 | Black ink 7 | 57 | Black ink 11 | 45 | 12 | A | A | A | B |
| Example 16 | Black ink 6 | 58 | Black ink 7 | 57 | 1 | A | A | A | C |
| Example 17 | Black ink 6 | 58 | Black ink 19 | 38 | 20 | A | B | A | A |
| Example 18 | Black ink 1 | 44 | Black ink 21 | 40 | 4 | A | A | A | A |
| Comparative example 1 | Black ink 3 | 38 | Black ink 10 | 39 | −1 | C | C | C | A |
| Comparative example 2 | Black ink 1 | 44 | Black ink 14 | 31 | 13 | C | D | C | A |
| Comparative example 3 | Black ink 8 | 58 | Black ink 16 | 35 | 23 | C | C | C | A |
| Comparative example 4 | Black ink 9 | 58 | Black ink 16 | 35 | 23 | C | C | C | A |

TABLE 3-continued

Combinations of the first and second black inks and evaluation results

| | First black ink | | Second black ink | | | Evaluation results | | | |
|---|---|---|---|---|---|---|---|---|---|
| | | | | | | | Fine-line quality | | |
| Example No. | NO. | $\gamma_1$ (mN/m) | No. | $\gamma_2$ (mN/m) | $\gamma_1 - \gamma_2$ (mN/m) | Suppression of image blurring | (1) Fine-line roughness | (2) Line-width reproducibility | Image fixability |
| Comparative example 5 | Black ink 3 | 38 | Black ink 13 | 34 | 4 | C | C | C | A |
| Comparative example 6 | Black ink 10 | 39 | Black ink 10 | 39 | 0 | C | D | C | A |

In the Examples above, comparison between Example 8 and Example 11 indicates that adjustment of surface tension with a water-soluble organic solvent provides higher image fixability than adjustment of surface tension with a surfactant.

According to the present invention, an inkjet recording method allowing an image-blurring suppression effect on a high level can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Patent Application No. PCT/JP2011/079035, filed Dec. 15, 2011, which is hereby incorporated by reference herein in its entirety.

The invention claimed is:

1. An inkjet recording method comprising:
a step of applying a pigment-containing first black ink through an inkjet recording head to a recording medium to record an edge region of an image; and
a step of applying a pigment-containing second black ink through an inkjet recording head to the recording medium to record an inner region of the image,
wherein a dynamic surface tension $\gamma_1$ of the first black ink determined by a maximum bubble pressure method for a lifetime of 100 ms and a dynamic surface tension $\gamma_2$ of the second black ink determined by a maximum bubble pressure method for a lifetime of 100 ms satisfy relationships of condition (1) of $\gamma_1 > \gamma_2$, condition (2) of $\gamma_1 - \gamma_2 \leq 20$ mN/m, condition (3) of 40 mN/m $\leq \gamma_1$, and condition (4) of 34 mN/m $\leq \gamma_2$.

2. The inkjet recording method according to claim 1, wherein the dynamic surface tension $\gamma_2$ of the second black ink further satisfies condition (5) of $\gamma_2 \leq 45$ mN/m.

3. The inkjet recording method according to claim 1, wherein the second black ink contains at least one selected from linear α,β-alkanediols whose alkyl groups have 5 or more carbons.

* * * * *